United States Patent
Cheruppanpullil et al.

(10) Patent No.: US 6,420,133 B1
(45) Date of Patent: Jul. 16, 2002

(54) PROCESS FOR THE PREPARATION OF A HIGH PROTEIN HYDROLYSATE

(75) Inventors: Radha Cheruppanpullil; Ramesh Kuamr Parigi; Prakash Vishweshwariah, all of Mysore (IN)

(73) Assignee: Council of Scientific and Industrial Research, New Delhi (IN)

( * ) Notice: Subject to any disclaimer, the term of this patent is extended or adjusted under 35 U.S.C. 154(b) by 0 days.

(21) Appl. No.: 09/820,206

(22) Filed: Mar. 28, 2001

(51) Int. Cl.⁷ .............................. C12P 21/06; A23J 1/00; A23J 1/02; A61K 38/00
(52) U.S. Cl. ...................... 435/68.1; 426/656; 426/657; 530/343
(58) Field of Search .................. 435/68.1; 426/656, 426/657; 530/343

(56) References Cited

U.S. PATENT DOCUMENTS

| | | | |
|---|---|---|---|
| 3,694,221 A | 9/1972 | Hoer et al. | 99/17 |
| 3,761,353 A | 9/1973 | Noe et al. | 195/29 |
| 4,757,007 A | 7/1988 | Satoh et al. | 435/69 |
| 5,077,062 A | 12/1991 | Ernster | 426/46 |
| 5,716,801 A | 2/1998 | Nielsen et al. | 435/68.1 |
| 6,221,423 B1 * | 4/2001 | Cho et al. | |

FOREIGN PATENT DOCUMENTS

| | | |
|---|---|---|
| EP | 0087246 | 8/1983 |
| EP | 0480104 | 4/1992 |

* cited by examiner

*Primary Examiner*—Christopher R. Tate
*Assistant Examiner*—Randall Winston
(74) *Attorney, Agent, or Firm*—Ladas & Parry

(57) ABSTRACT

The present invention provides an improved process for the preparation of high protein dietary food containing optimum nutritional composition of amino acids. The novelty of the process lies in the step of producing optimally mixed flour from different oilseed flours by hydrolysing the protein using successive and specific enzymatic reaction to get a final product having optimum desired nutritional composition of amino acids and quality protein.

14 Claims, No Drawings

PROCESS FOR THE PREPARATION OF A HIGH PROTEIN HYDROLYSATE

FIELD OF THE INVENTION

The present invention relates to a process for the preparation of a high protein hydrolysate.

BACKGROUND OF THE INVENTION

Oilseed proteins are a potentially important source of human dietary protein throughout the world. Usage of oilseed proteins as such is limited because of its poor solubility in water, presence of antinutritional factors, poor digestibility, etc. Following oil removal, the protein present in defatted cake is heat denatured and therefore directly unextractable. Hence proteolysis is an attractive approach for recovering the protein from cake in soluble form and affords a high protein preparation suitable for protein fortification of a wide variety of foods. Also enzymatic hydrolysis is an attractive means of obtaining better functional properties of food proteins without impairing their nutritional value.

Oilseeds such as groundnut, sesame, soyabean contains large amount of high quality protein and is being utilized as excellent source of plant based protein. The isolate from proteins is useful as food supplement.

During the past decade utilization of plant protein especially from soyabean and groundnut has increased tremendously primarily for nutrition and economic reasons.

Reference is made to Tsumura et al (2000) U.S. Pat. No. 6,022,702, (Fuji Oil Company Limited), wherein a process for producing a soy protein hydrolysate with a low content of glycinin is described. In the above reference an aqueous suspension of soy isolate is hydrolysed with pepsin at a concentration of about 0.001% to about 0.5% by weight of the isolate at a pH range from about 1.0 to about 2 8 and at a temperature range of 20–50° C. to obtain a protein hydrolysate. The proteolytic enzyme used in the process (pepsin) selectively decomposes glycinin in the soybean protein. The hydrolysis is performed at an acidic pH. The drawbacks in such hydrolysis is that during neutralization of the acid hydrolysates due to formation of salts, there is accompanying salty taste and precipitation when added to acid beverages.

Reference is made to pending Indian Patent Application Nos. 1355/Del/99 and 1347/Del/2000 wherein similar approach have been made however the process mainly confined to single source of raw material viz. soyabean.

Reference is made to Chervan, et al. (1984) U.S. Pat. No. 4,443,540 (University of Illinois Foundation), wherein a process for the preparation protein hydrolysates by enzymatic hydrolysis and recovering the low molecular weight protein material by ultrafiltration is described. In the above reference, soy protein isolated is hydrolysed using an alkaline protease (pronase) at a temperature of 25–60° C., pH 7.0–9.0. The hydrolysed protein material is subjected to filtration successively through a series of selected hollow fiber membranes to separate into higher average molecular weight protein hydrolysate fraction and a lower average molecular weight protein hydrolysate fraction. The drawbacks in such hydrolysis, is that, if the extent of reaction is not controlled carefully off flavor or bitterness may develop.

Reference is made to Hamm, D. J. (1993) U.S. Pat. No. 5,180,597, (CPC International Inc.), wherein a process for hydrolyzed vegetable protein with enhanced flavor, which contains no detectable level of monochlorodihydroxypropanol, is described. In the above reference, wheat gluten is hydrolyzed using Prozyme 6 (a fungal protease) at a temperature of 40–50° C., pH 6.5–7.0, enzyme concentration of 0.1–2.0% of substrate for a time period of 4 hrs. The hydrolyzed protein is treated with gaseous HCl for deamidation before the addition of acid for inactivating the enzyme. The drawbacks in such hydrolysis is that it is likely to lead to racemisation of amino acids and the addition of acid is likely to increase the salt content in the product.

Reference is made to Ernster, J. H. (1991), U.S. Pat. No. 5,077,062, (Excelpro Inc., Los Angeles, Calif., USA,) wherein a low sodium, low mono sodium glutamate soy hydrolysate prepared from soy material such as soy flour, soy meal or soy grits using fungal protease in water is described. The hydrolysis is conducted in the absence of acid or base at 90° C. for 2 hrs. After deactivating the enzyme and dewatering the mixture the resulting hydrolysate contains between 45 and 55 wt. % enzymatically hydrolyzed soy based protein with an average molecular weight of 670,000±50,000. The fungal protease used is different from the enzyme used in the present invention. Such single enzyme systems are likely to result in bitter peptides and the process is energy intensive due to the high temperature (90° C.) used.

Reference is made to Satoh et al., (1988) U.S. Pat. No. 4,757,007, (Nisshin Oil Mills, Tokyo, Japan) wherein the method describes preparation of two hydrolyzed products using a protease from soy protein. The soy protein is hydrolysed with papain or pepsin after precipitating with alcohol. The drawback of the process is it involves the separation of the mixture of hydrolysed products. Hydrolysis is carried out using papain or pepsin. Acidification is carried out to bring down the pH to 2.5–5.0 to separate the two kinds of hydrolysates, which could lead to increase in salt content.

Reference is made to Cipollo, K. L. and Wagner, T. J., (1987) European Patent No. 0148600 B 1, Ralston Purina Co., wherein the described process relates to the preparation of hydrolyzed protein from protein isolate after jet cooking or dynamic heating at 104° C. for a few seconds and later cooled in a vacuum chamber before hydrolysis using bromelain. The protein was precipitated at its isoelectric point from an aqueous extract of the material before the hydrolysis. The drawback of the process is the starting material protein isolate, which is more expensive. The process is a multi step process, energy intensive. The process further needs machines like the jet cooker and a vacuum chamber.

Reference is made to Parker, D. M. and Pawlett, D. (1987) European Patent No. 0223560 A2, Imperial Biotechnology Ltd., wherein the method describes the separation of protein hydrolysates with meat and cheese flavor, from proteinaceous feed stocks (e.g. containing soybean, gluten, whey, casein, hemoglobin, yeast, cereal or microbial proteins) by stepwise hydrolysis using an endopeptidase followed by amino peptidase from Streptococcus laetus. The drawback of the process is it is a multi-step process.

Reference is made to Lee, (1986) European Patent No. 0087246 B1, Staffer Chemical Co. wherein a process for the hydrolysis of soybeans, wheat gluten and cotton seeds using fungal protease from Aspergillus and pancreatin (trypsin, chymotrypsin A, B and C, elastase and carboxypeptidase A and B) is described. Activated charcoal is used to treat the hydrolysate, which is used for nutritional improvement. The draw back of the process is that it involves many steps.

Reference is made to Boyce, C. O. L. et al., (1986) European Patent No. 0187048 A2, NOVO Industries A/S, wherein a process is described for the preparation of soy protein hydrolysate with 0.25 to 2.5% degree of hydrolysis (DH) using microbial rennet (*Mucor miehei*) and to be used as an egg white substitute. The enzyme used in this process is different and involves low degree of hydrolysis of soy protein.

Reference is made to Olsen, H. S. (1981), UK Patent No. 2053228A, wherein a process for the production of soy protein hydrolysate from partially defatted soy material by hydrolysis with proteolytic enzyme is described. The drawback of the process is that due to partial defatting soy flour, left over oil comes in contact with protein phase, which could lead to off-flavours.

Reference is made to Olsen, H. S. (1981) U.S. Pat. No. 4,324,805, wherein a method is described for producing soy protein hydrolysate and oil from partially defatted soy material by hydrolysis with proteolytic enzyme. The soyflour is partially defatted by water washing at pH 3.5–4.5 and later hydrolysed using water and a base to increase the pH. The degree of hydrolysis (DH) is in the range of 8–12%. Oil is recovered from the wash water. Alcalasc is the enzyme used. The drawback of the process is that it is a multi step process and due to partial defatting of soy flour, left over oil comes in contact with protein phase which could lead to off-flavours. Enzyme inactivation is done by addition of acid, which is likely to lead to increased salt content in the product.

Reference is made to Sherba and Steiger (1972), U.S. Pat. No. 3,640,725, wherein enzymatic hydrolysis process for production of soy protein hydrolysates is described. The soy seeds are powdered and heated at 90–140° C. Protease (fungal and bacterial) is added at 25–75° C. The fiber is separated and slurry has two phases-oil and aqueous phase. Aqueous phase is brought to pH 4.5 to precipitate the protein which is then concentrated. The starting material is not defatted and hence the residual oil could come in contact with the aqueous phase which could lead to off-flavors.

Reference is made to Gunther, R. C. (1972) Canadian Patent No. 905742, wherein soy protein hydrolysate is modified with pepsin to yield a product, which in presence of water and sugar whips at a rapid rate to produce aerated products of low density.

Reference is made to Tsumura, K. et al., (1997) European Patent No. 0797928 A1, wherein a process for the manufacture of a soy protein hydrolysate with a protease used selectively to decompose glycinin at a pH of 1.5–2.5 is described. The pH used in the process is very low in order to achieve a low glycinin content.

Reference is made to a published paper entitled "Industrial production and application of soluble enzymatic hydrolysate of soy protein", Olsen, H. S., Adler Nissen, J. (1979), Process Biochemistry, 14(7), 6, 8, 10–11, wherein a method for preparation of soy protein hydrolysate from soy flakes washed at pH 4.5 followed by hydrolysis using alcalase is described. The solubility of the substrate is low at the acidic pH which is likely to result in low yields. The enzyme used is different from the enzyme used in the present invention.

OBJECTS OF THE INVENTION

The main object of the present invention is to provide an improved process for the preparation of a protein hydrolysate containing optimum composition of amino acids which obviates the drawbacks as described above.

Another object is to get the protein hydrolysate using double enzyme hydrolysis using proteolytic enzymes.

Yet another object of the present invention is to get higher yield of protein hydrolysates and with a specified degree of hydrolysis from the raw material taken.

The novelty of the process lies in the step of converting the protein in the optimally mixed flour from different oilseed flours using successive and specific enzymatic reaction to get a final product having optimum composition of essential amino acids and quality protein in terms of amino acid composition.

SUMMARY OF THE INVENTION

Accordingly the present invention provides a process for preparation of a high protein hydrolysate, which comprises:
a) selecting protein material in the form of flour;
b) mixing the oilseed in flour in a ratio of 1–1.5:1.5–2:0.5–1;
c) dispersing the selected mixed flour obtained from step (b), in aqueous medium at a controlled temperature and alkaline pH for 1–2 hrs;
d) raising the temperature of the slurry (c) up to 40–50° C.;
e) hydrolyzing the slurry obtained for step (d) using fungal enzyme at controlled temperature for 2–3 hrs.;
f) raising the temperature of the slurry (e) up to 50–60° C.;
g) hydrolysing the incubated slurry (f) with plant enzyme at a controlled temperature and time of 50–60° C. and 1–2 hrs respectively;
h) deactivating the residual enzyme keeping the slurry on a waterbath for 10–15 min at 90–100° C.;
i) recovering the low molecular weight protein hydrolysate from the protein fraction of the hydrolysis step (h) by centrifugation;
j) determining protein content and amino acid content in the sample;

In an embodiment of the invention, the protein material selected comprises a mixture of defatted oilseed flours from plant source selected from the group consisting of soyabean, sesame and groundnut.

In an another embodiment of the invention, the defatted oilseed flour obtained from soyabean, sesame and groundnut is mixed in the ratio of 1–1.5:1.5–2.0:0.5–1 respectively.

In yet another embodiment of the invention, the alkaline pH of the dispersed medium is maintained in the range of 7 to 8.

In an embodiment of the invention the solid content in the slurry is in the range of 8–15% w/v.

In yet another embodiment of the invention the proteolytic enzymes is selected from a fungal protease and a plant protease.

In another embodiment of the invention, the fungal protease used is in the range from 0.3–1% w/w and plant protease used is in the range of 0.3–1% w/w of the mixed flour.

In embodiment of the invention the protein hydrolysate has a molecular weight in the range of 2500±1000 to 10000±1500.

In embodiment of the invention the protein filtrate is subjected to centrifugation at 6000 rpm for maximum 30 min followed by freeze drying of the supernatant.

In embodiment of the invention the protein hydrolysate content in the mixed oilseed flour is 65–72% with a foam capacity of 100–122%.

In another embodiment of the present invention, the protein hydrolysate contains the following essential amino acid contents: lysine 3.5%, threonine 2.1%, valine 3.8%, methionine 1.5%, isoleucine 2.9%, leucine 5.5%, phenylalannine 3.6% and Tyrosine 3.5%.

DETAILED DESCRIPTION OF THE INVENTION

The invention is described hereinbelow with reference to the examples which are merely illustrative and should not be construed as limiting the scope of the invention in any manner.

(a) Preparation of Defatted flour

Soybean, sesame and groundnut seeds were precleaned. The cleaned seeds are passed through a cracking process and the seed fragments are graded on sieves by aspirate system. The cleaned cracked seeds are passed through a conditioner cooker and flaked. The flakes are subjected to solvent extraction process. The extracted flakes were desolventized and ground to 100 mesh. The specifications for the three flours consist of (a) moisture % by mass, max. 9.27% (b) protein on dry basis % by mass, min. 49%, 58% and 55% for soybean, sesame and groundnut respectively (c) fat on dry basis % by mass, max. 1% (d) the total ash on dry basis, % by mass max. 7.4% (e) residual solvent 170 ppm.

(b) Preparation of Mixed flour

Amino acid composition of the three total proteins (soybean, sesame and groundnut) were determined and the flours mixed in a ratio of 1–1.5:1.5–2:0.5–1 for soybean, sesame and groundnut respectively to get a mixed flour having a balanced amino acid profile. The specification for the mixed flour was (a) moisture % by mass, max. 9.2% (b) protein on dry basis % by mass, min 49% (but in the range of 49–58%) (c) fat on dry basis % by mass, max. 1% (d) the total ash on dry basis % by mass, max. 7.4% (c) residual solvent 170 ppm.

Fungal enzyme

Commercially available food grade enzyme protease P "Amano"6 from M/s Amano Pharmaceutical Co. Ltd., 2-7, 1-Chome, Nishiki, Nak-Ku, Nagoya, 460, Japan, having not less than 60,000 U/g proteolytic activity.

Papain

The specification of the plant thiol protease papain is to obtain commercially available food grade enzyme having proteolytic activity not less than 20,000 Tyrosine Units (TU)/mg proteolytic activity.

Measurement of Degree of Hydrolysis (DH)

Trinitrobenzenesulphonic acid (TNBS) procedure, is an accurate, reproducible and generally applicable procedure for determining the degree of hydrolysis of food protein hydrolysates. The protein hydrolysate is dissolved/dispersed in hot 1% sodium dodecyl sulphate to a concentration of $0.25–2.5\times10^{-3}$ amino equivalents/L. A sample solution (0.25 ml) is mixed with 2 ml of 0.2 M sodium phosphate buffer (pH 8.2) and 2 ml of 0.1% TNBS, followed by incubation in the dark for 60 min at 50° C. The reaction is quenched by adding 4 ml of 0.1N hydrochloric acid (HCl) and the absorbance is read at 340 nm. A 1.5 mM L-leucine solution is used as the standard. Transformation of the measured leucine amino equivalents to a degree of hydrolysis is carried out by means of a standard curve for each particular protein substrate. (Adler-Nissen, J. (1979) J. Agr. Food Chem 27, 6, 1256–1262).

Defatted mixed flour was dispersed in water with a suitable solvent to solute ratio and the pH of the dispersion was adjusted using 6N sodium hydroxide or 6N hydrochloric acid. This was kept stirring for a few minutes with mechanical stirrer and then temperature raised to 40–45° C. At this stage 0.3–1% of fungal enzyme on the basis of mixed flour was added and stirring continued for 2 hrs. At the end of stipulated time the temperature of the slurry was raised to 50–60° C. To this, 0.3–1% w/w of papain on the basis of mixed flour was added and stirring continued for 1–2 hrs. At the end of the above time interval the temperature of the slurry was raised to 90–95° C. for 10–15 minutes. The slurry was cooled to room temperature and the insoluble carbohydrate rich fraction was removed by centrifugation. The clarified protein hydrolysate was spray dried to obtain protein hydrolysate.

The following examples are given by way of illustration of the present invention and therefore should not be constructed to limit the scope of the present invention.

EXAMPLE 1

Twenty-five grams of defatted mixed flour is dispersed in 250 ml of water and the pH of the dispersion was adjusted to 7.2 by using 6N sodium hydroxide solution. It was kept stirring for 20 min with mechanical stirrer and temperature raised to 40° C. by heating. At this stage, 125 mg of fungal protease was added and stirring continued for 2 hrs. At the end of 2 hrs, temperature was raised to 50° C. by heating and the second enzyme, papain (125 mg), was added and kept stirring for 1 hr. After the hydrolysis, the resultant solution was boiled for 10 min for enzyme inactivation. The slurry was centrifuged using basket centrifuge. The clear solution was lyophilised. The yield was 65% on protein basis and degree of hydrolysis by TNBS method was found to be 43%. Amino acid composition of the protein hydrolysate was determined by HPLC. The essential amino acid contents were as follows; lysine 3.5%, threonine 2.1%, valine 3.8%, methionine 1.5%, isoleucine 2.9%, leucine 5.5%, phenylalannine 3.6% and tyrosine 3.5%.

EXAMPLE 2

Fifty grams of mixed flour is dispersed in 500 ml of water and the pH of the dispersion was adjusted to 7.3. It was kept stirring for 20 min with mechanical stirrer and temperature raised to 43° C. At this stage 250 mg of fungal protease is added and stirring continued for 1.5 hrs. At the end of 2 hrs, the temperature was raised to 53° C. and the second enzyme papain (250 mg) was added and kept stirring for 1 hr. After the hydrolysis the hydrolysate was boiled for 15 min. for enzyme inactivation and centrifuged. The clear solution was lyophilised. The yield was 68.0% on protein basis and degree of hydrolysis by TNBS method was 39%. Amino acid composition of the protein hydrolysate was determined by HPLC. The essential amino acid contents were as follows; lysine 3.5%, threonine 2.1%, valine 3.8, methionine 1.5%, isoleucine 2.9%, leucine 5.5%, phenylalannine 3.6% and tyrosine 3.5%.

EXAMPLE 3

One hundred grams of defatted mixed flour is dispersed in 1 L of water and the pH of the dispersion was adjusted to 7.6. It was kept stirring for 20 min with mechanical stirrer and then temperature raised to 45° C. At this stage 500 mg of fungal protease is added and stirring continued for 2 hrs. At the end of 2 hrs the temperature was raised to 55° C. and the second enzyme papain 500 mg was added and kept stirring for 1.5 hrs. After the hydrolysis, the hydrolysate was boiled for 10 min for enzyme inactivation and centrifuged. The clear solution was spray dried. The yield was 70% on protein basis and degree of hydrolysis by TNBS method was 38%. Amino acid composition of the protein hydrolysate was determined by HPLC. The essential amino acid contents were as follows, lysine 3.5%, threonine 2.1%, valine 3.8%, methionine 1.4%, isoleucine 2.9%, leucine 5.5%, phenylalannine 3.6% and tyrosine 3.5%.

EXAMPLE 4

One kg of mixed flour is dispersed in 10 L of water and the pH of the dispersion was adjusted to 7.6. It was kept stirring for 15 min with mechanical stirrer and then temperature raised to 45° C. At this stage, 5 gms of fungal protease is added and stirring continued for 2 hrs. At the end of 2 hrs, the slurry temperature was raised to 55° C. and the second enzyme papain (5 gms) was added and kept stirring for 1.5 hrs. After hydrolysis, the hydrolysate was boiled for 15 min for enzyme inactivation and centrifuged in the basket centrifuge. The clear solution was spray dried. The degree of hydrolysis was found to be 38% and the yield was 70% on protein basis. Amino acid composition of the protein hydrolysate was determined by HPLC. The essential amino acid contents were as follows; lysine 3.5%, threonine 2.1%, valine 3.8%, methionine 1.5%, isoleucine 2.9%, leucine 5.5%, phenylalannine 3.6% and tyrosine 3.5%.

The main advantages of this invention are
1. By using this process, the product attains a property of becoming a good additive without imparting any undesirable off flavor for the finished product.
2. The process yields a quality hydrolysate which has a solubility independent of pH making it a suitable additive either in acid pH or alkaline pH.
3. The Nitrogen recovery from the mixed flour is 80–90% which is higher compared to any present method of commercial production.
4. The yield of protein hydrolysate is 65–72%.
5. The time of hydrolysis is short having advantage both in input cost and energy
6. The enzyme employed is a food grade enzyme which is commercially available.
7. The nutritive value of starting material is preserved with minimum loss of essential amino acids.
8. The essential amino acid contains the protein hydrolysate obtained by this method is comparable to FAO requirement of essential amino acids.

We claim:
1. A process for preparation of a high protein hydrolysate, said process comprising:
 a) selecting two or more protein materials in the form of defatted oilseed flours;
 b) mixing the defatted oilseed flours;
 c) dispersing the mixed flour obtained from step b), in aqueous medium at a controlled temperature and alkaline pH for 1–2 hrs to form a slurry;
 d) raising the temperature of the slurry up to 40–50° C.;
 e) hydrolyzing the slurry obtained in step d) using fungal enzyme at controlled temperature for 2–3 hrs;
 f) raising the temperature of the slurry from step e) up to 50–60° C.;
 g) hydrolysing the slurry of step f) with plant enzyme at a temperature of 50–60° C. for 1–2 hrs;
 h) deactivating the residual enzyme by keeping the slurry on a waterbath for 10–15 min at 90–100° C.;
 i) recovering a low molecular weight protein hydrolysate from the protein fraction of the hydrolysis step h) by centrifugation; and hydrolysate.

2. The process as claimed in claim 1 wherein the protein materials are selected from a plant source selected from soyabean, sesame or groundnut.

3. The process as claimed in claim 2, wherein the soyabean, sesame and groundnut flour are mixed in a ratio of 1–1.5:1.5–2:0.5–1.

4. The process as claimed in claim 1 wherein the alkaline pH is maintained in a range of from 7 to 8.

5. The process as claimed in claim 1 wherein the amount of solids in the slurry is 8–15% w/v.

6. The process as claimed in claim 1 wherein the fungal enzyme is an alkaline protease.

7. The process as claimed in claim 6 wherein the amount of the alkaline protease is in the range of 0.3–1% w/w of the mixed flour.

8. The process as claimed in claim 1 wherein the protein hydrolysate has a molecular weight in the range of 2500±1000 to 10000±1500.

9. The process as claimed in claim 1 wherein the protein fraction is subjected to centrifugation at 6000 rpm for maximum 30 min followed by freeze drying the supernatant.

10. The process as claimed in claim 1 wherein the protein hydrolysate content in the mixed oilseed flour is in the range of 65–72% with a foam capacity of 100–122%.

11. The process as claimed in claim 1 wherein, the protein hydrolysate contains an essential amino acid content of lysine 3.5%, threonine 2.1%, valine 3.8%, methionine 1.5%, isoleucine 2.9%, leucine 5.5%, phenylalanine 3.6% and tyrosine 3.5%.

12. The process as claimed in claim 1 wherein the plant enzyme is a plant protease.

13. The process as claimed in claim 1 wherein the plant enzyme is papain.

14. The process as claimed in claim 12 wherein the amount of the plant protease is in the range of 0.3–1% w/w of the mixed flour.

* * * * *